Figure 1:
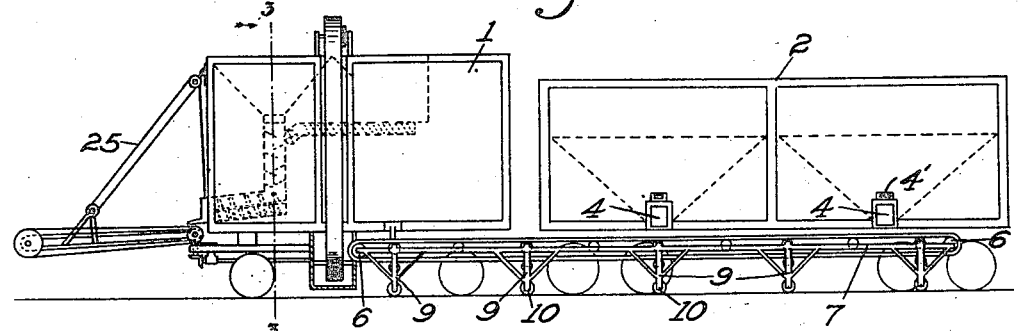

J. F. GARRETTY.
APPARATUS FOR MIXING AND DISTRIBUTING CONCRETE, &c.
APPLICATION FILED MAY 29, 1905.

1,075,350.

Patented Oct. 14, 1913.
4 SHEETS—SHEET 1.

WITNESSES

INVENTOR
John F. Garretty.
BY
*Frank E. Adams*
ATTORNEY.

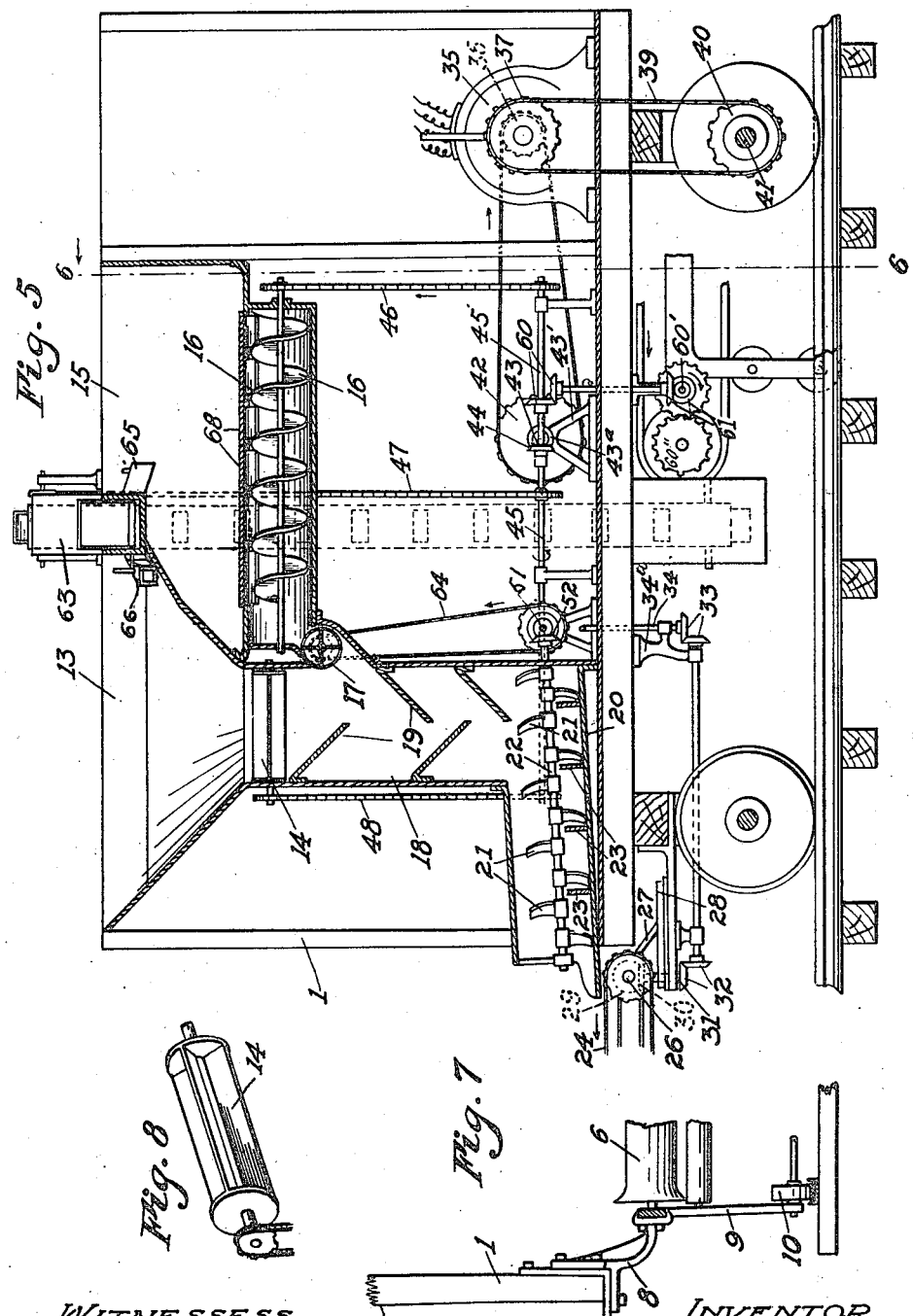

J. F. GARRETTY.
APPARATUS FOR MIXING AND DISTRIBUTING CONCRETE, &c.
APPLICATION FILED MAY 29, 1905.
1,075,350.
Patented Oct. 14, 1913.
4 SHEETS—SHEET 3.
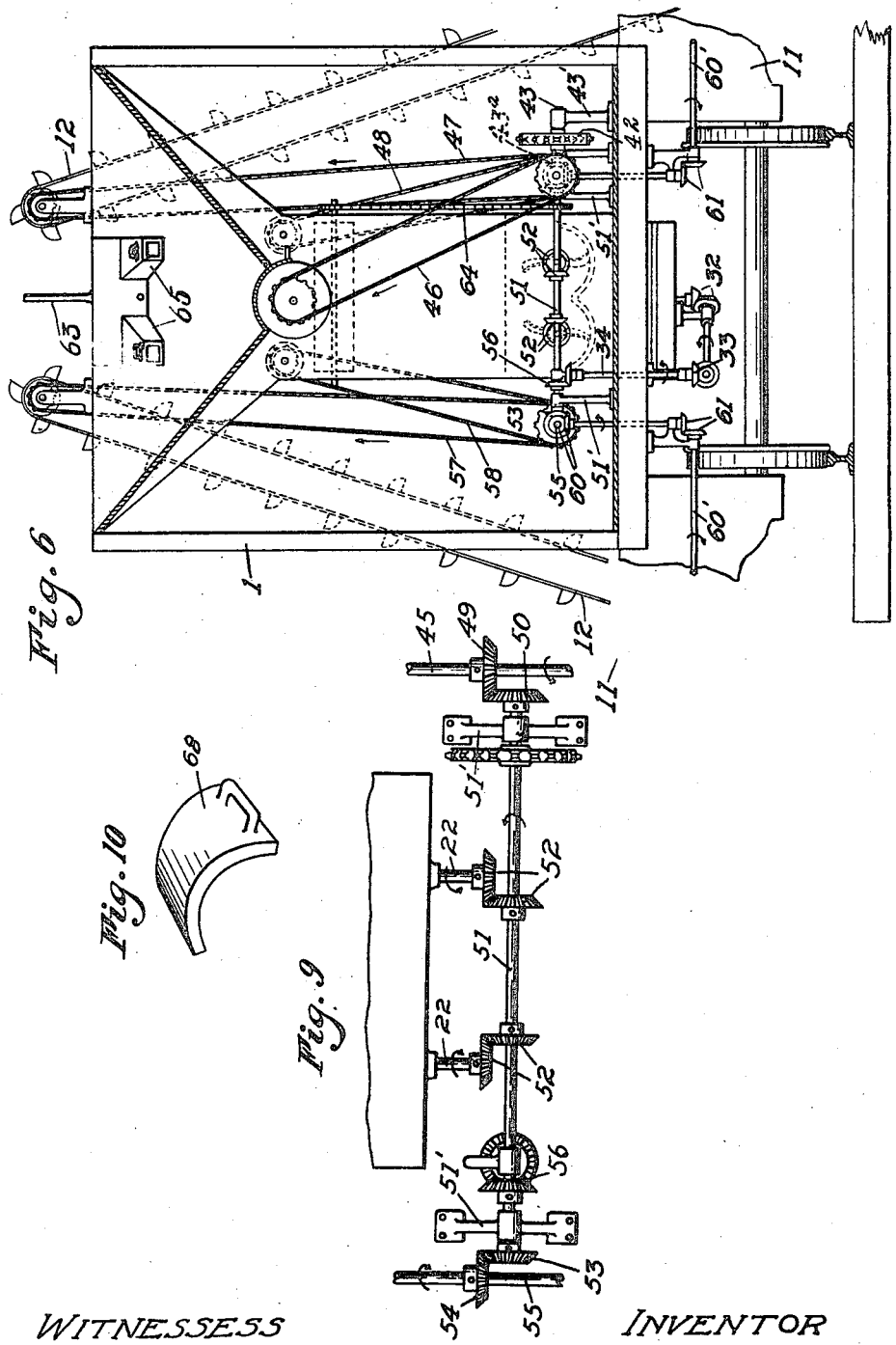
WITNESSES
INVENTOR
John F. Garretty.
BY
Frank E. Adams
ATTORNEY J. F. GARRETTY.
APPARATUS FOR MIXING AND DISTRIBUTING CONCRETE, &c.
APPLICATION FILED MAY 29, 1905.
1,075,350.
Patented Oct. 14, 1913.
4 SHEETS—SHEET 4.
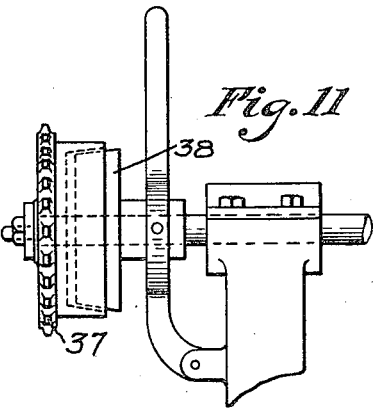
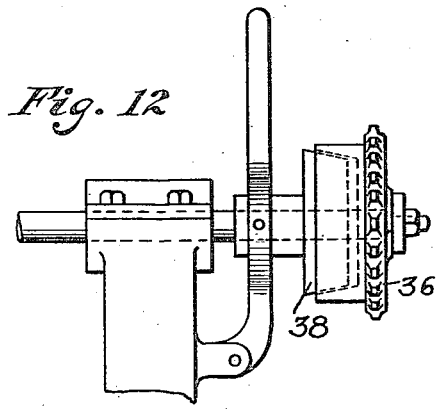
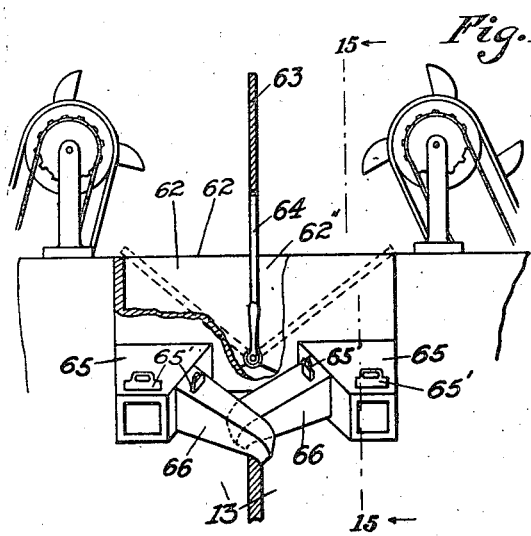
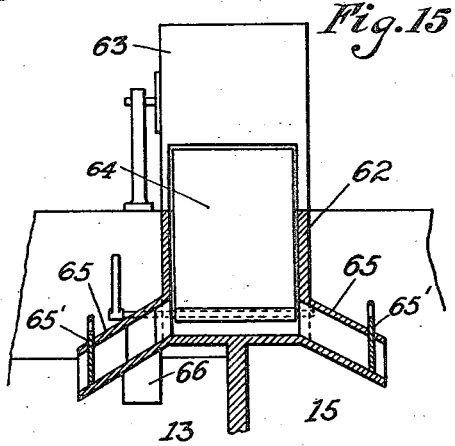
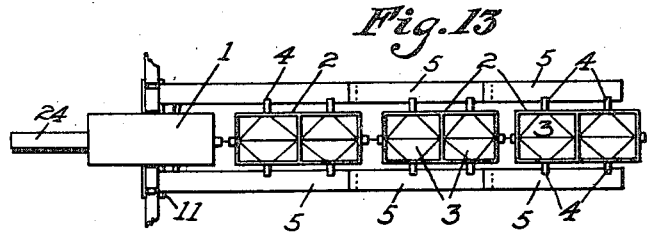
Witnesses
F. Dudley Moss.
Rufus B. Clark.
Inventor
John F. Garretty.
Frank E. Adams
Attorney

UNITED STATES PATENT OFFICE.

JOHN F. GARRETTY, OF SEATTLE, WASHINGTON.

APPARATUS FOR MIXING AND DISTRIBUTING CONCRETE, &c.

1,075,350.　　　　　Specification of Letters Patent.　　Patented Oct. 14, 1913.

Application filed May 29, 1905.　Serial No. 262,912.

*To all whom it may concern:*

Be it known that I, JOHN F. GARRETTY, citizen of the United States, residing at Seattle, in the county of King and State of Washington, have invented certain new and useful Improvements in Apparatus for Mixing and Distributing Concrete, &c., of which the following is a specification.

My invention relates to improvements in apparatus for mixing and depositing concrete, etc., and the primary object thereof is to provide an improved apparatus which will take concrete materials as they come from the gravel beds in original vehicles, convey them, mix them and deposit them as concrete in place without any personal handling of the materials whatsoever.

At present the custom pursued in street paving is to bring the requisite materials to the job some time in advance of their being used, and they are deposited along the work or at stations along the work, and generally upon the ground, and then they are afterward transferred to the paving mechanism by manual labor. Much of the material cannot be recovered from the ground where it was deposited and hence is wasted, while there is frequently a surplus of material to be rehandled and redeposited. If planking be laid down to diminish this waste, there is the cost of building and removing these planked stations. These piles of material accumulated upon the thoroughfares in advance are an inconvenience to the public and the contractor must incur the expense of frequently trimming them, putting lanterns on them at night, etc. By using my machine the wagons which bring the materials onto the job discharge them clean into the machine without waste, and the hauling is governed by an approximate schedule, so that the materials are brought to the job substantially as they are needed. By having bunkers with a capacity of several wagon loads, considerable variation in the schedule is permissible without interrupting the continuance of the work of the machines. There is no waste of material; no manual labor is required to feed the mixer or offbear the concrete to its place of deposit; and the mixer works continuously and steadily at its full capacity.

With the above and other objects in view, as set forth in the following description, the invention consists of the parts, arrangement and combination of parts, hereinafter described and succinctly defined in the appended claims.

Figure 2:
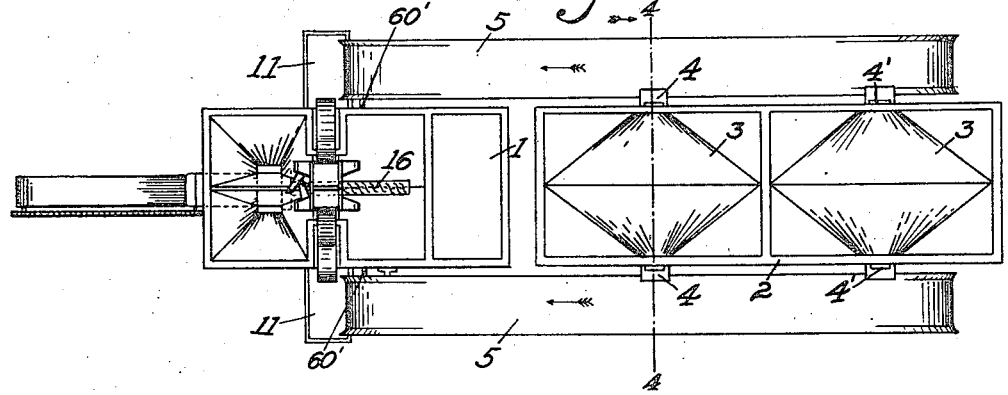
Figure 3:
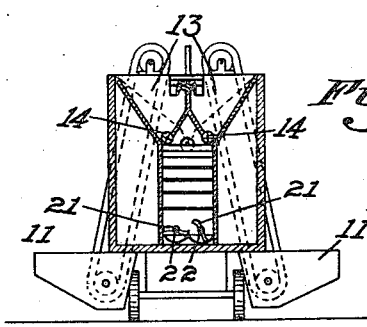
Figure 4:
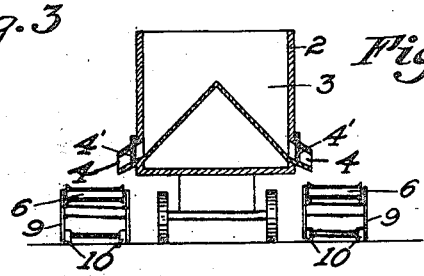

In the accompanying drawings, in which like numerals of reference indicate like parts throughout the several views: Figure 1 is a view in side elevation, diagrammatically illustrating the present invention. Fig. 2 is a top plan view thereof. Fig. 3 is a section taken on line 3—3 of Fig. 1. Fig. 4 is a section taken on line 4—4 of Fig. 2. Fig. 5 is a longitudinal sectional view through the vehicle provided with the mixing mechanism. Fig. 6 is a section taken on line 6—6 of Fig. 5. Fig. 7 is a detail fragmentary view, illustrating more clearly the means for securing the conveyers to the vehicle containing the mixing mechanism. Fig. 8 is a detail view in perspective of one of the rotary measurers. Fig. 9 is a detail fragmentary view showing more particularly shaft 51 and the parts directly associated therewith. Fig. 10 is a detail view in perspective of one of the doors arranged in the bottom of the gravel bunker. Figs. 11 and 12 are detail fragmentary views of the clutches arranged on the motor shaft. Fig. 13 is a top plan view on reduced scale showing a number of supply cars arranged along side of the sectional conveyers which convey the material to the car or vehicle containing the mixing mechanism. Fig. 14 is a detail fragmentary view showing the three-way gates into which the elevators discharge, and Fig. 15 is a section taken on line 15—15 of Fig. 14.

The invention contemplates the provision of a vehicle having a mixer, a distributer, bunkers for the sand, gravel and cement or other materials to be mixed, and suitable conveying means for transferring the same from cars or wagons to the bunkers of the vehicle having the mixing means, all of said parts being suitably connected and coördinated so that the apparatus can have all of its parts simultaneously operated and continuously supply itself with raw materials while moving or stationary.

While the drawings illustrate the principle of my invention and show one of the ways it can be applied, it can also be applied in various other ways. I do not wish to be restricted to the single application shown, but to claim broadly all substantially equivalent ways and means for doing the same work.

In the drawings Figs. 1 and 2 indicate the vehicles, the form shown being only one of several ordinarily used to bring materials for mixing to the scene of the work and capable of being used in connection with the rest of my apparatus.

The invention is particularly designed to be applicable to any form of car or wagon in common use for hauling sand or gravel which is adapted to discharge its contents by gravity and has means for directing and regulating its discharge, each type being positioned so that its point of discharge will be substantially over the conveyer.

The type of cars shown have their bottoms inclined from an approximately central point to the sides of the vehicles which are provided with spouts 4 adapted to discharge onto the troughed conveyers 5, said conveyers passing over rollers 6 journaled in frames 7. The frames 7 are firmly connected to vehicle 1 by brackets 8 so as to be moved therewith, as hereinafter more fully explained, and are provided with supporting legs 9 to which rollers or wheels 10 are secured.

As shown in Fig. 13 a number of conveyer frames are placed end to end with their conveyers 5 in overlapping relation, said frames being rigidly connected end to end in any desired manner, so that a number of vehicles containing materials to be mixed can be arranged on a track and the conveyers extended accordingly.

The cars or wagons 2 are arranged so that their outlets will be substantially over the conveyers 5 (see Fig. 2) and the materials they contain will fall by gravity onto said conveyers, which then convey the cement, sand and gravel or other ingredients from the hoppers 3 to elevator boots 11 secured to the side of vehicle 1. Said materials are then lifted by conveyers 12, which acts as elevators, to bunkers 13 and 15, as more fully hereinafter explained, and it is discharged from these bunkers in measured quantities by rotary measurers 14 and 17, which are of a well known type, the same being formed with suitable peripheral pockets.

All the bunkers 13 and 15 are designed for the storage in reserve of large quantities of the different materials to be mixed, the gravel, for instance, in bunker 15 being conveyed by spiral conveyer to measurer 17, which discharges it through chute 18 into the mixer.

The spouts 4 are provided with sliding gates, as 4' and consequently by keeping the proper gates closed and the other open material in vehicles 2 will be discharged onto one or other of conveyers 5. Thus, for example, we will assume that the vehicle arranged next to vehicle 1 contains sand and its spouts at one of its sides are open to discharge onto the adjacent conveyer. The spouts at the opposite side of this car are then closed. The next car which may contain gravel, has those of its spouts which discharge onto the other conveyer 5 open, and thus one of the conveyers 5 will be conveying sand and the other gravel. When, however, it is desired to convey cement, those spouts of the first two mentioned vehicles 2 discharging onto one or the other of conveyers 5 are closed, and the conveyer 5 which will then be running idly can be employed to convey cement from another car which, for example, may be the third vehicle from vehicle 1.

When all the material in a vehicle which will fall by gravity through those spouts at one side has been discharged, the other spouts, or those arranged at the opposite side of the vehicle, are opened and the remaining material in the vehicle will then be conveyed on the other conveyer 5. Or both conveyers, or even one, can alternately convey the different materials singly from the car 2 to the vehicle 1, inasmuch as the speed and capacity of the conveyers are designed to greatly exceed the consuming capacity of the mixer and each bunker is designed to hold enough material to supply the mixer until its turn comes to again receive a fresh supply, when the conveyer quickly fills it and then is employed with another material, and so on. Of course means has to be provided to insure the delivery of the several materials to their proper bunkers in vehicle 1 when said materials are conveyed by either conveyer 5, and this mechanism I will describe in the following: It will be observed that the sand and cement are also discharged into chute 18, and by reason of staggered plates 19 the sand, gravel and cement will be partly intermingled during their descent to trough 20, in which the materials receive their final treatment, the same being thoroughly commingled by agitators 21 mounted on shafts 22. These agitators are curved slightly and have their faces beveled to their planes of revolution. They will therefore serve as shovels to crowd the material toward the lower ends of the several compartments into which trough 20 is divided by partitions 23, and then lift the material over said partitions. Trough 20 is inclined so as to aid the agitators in crowding the material toward the discharge end thereof, at which point said material is delivered onto a conveyer 24 which serves as a distributer and is adapted to be swung from side to side to carry and deliver said material to any desired point.

Conveyer 24 is elevated by block and tackle indicated by numeral 25, the shaft 26 of the inner roller over which said conveyer passes being journaled in a bracket or standard 27 rigidly secured to a turn table 28. Shaft 26 is provided with a beveled gear 29 which meshes with a similar gear 30, fixed to shaft 31. Shaft 31 projects through the turn table and through a suitable underlying bearing plate and while serving as the pivot of said turn table is also capable of rotation independently thereof, whereby conveyer 24 is driven, the same being driven by gearing 32 and 33 from shaft 34.

Other types of cars and wagons than those shown, and especially individual and smaller ones, would generally remain entirely independent of vehicle 1, as they would come into position with their outlets over the conveyer, quickly discharge their contents onto it and depart, to be succeeded by others. But with a train of cars arranged as shown on the same track with the mixer vehicle the progressive travel of the latter would cause it to push back the vehicles 2, and, while for this purpose it is not necessary that they be coupled together, still if desired they can be coupled in any well known way, that illustrated being merely an arbitrarily selected form. The motive power for moving the vehicles and operating the mechanisms consists of a motor 35, on the shaft of which are arranged gears 36 and 37, the latter having a chain 39 passing thereover and over a sprocket wheel 40 fixed to axle 41. Clutches 38 connect these gears 36 and 37 to the shaft of the motor and, as is obvious, either of said gears can therefore be readily released or made fast relatively to the shaft. By this construction the motor can serve as the propelling means for progressively moving the said vehicles 1 and 2 and also to drive the several mechanisms, the movement of the vehicles and the operation of the mechanisms being constantly related and connected. A chain passes over gear 36 and a similar gear 42 fixed to a cross shaft 43 which is journaled in standards 43'. Shaft 43 is also provided with a beveled gear 43ᵃ which meshes with gear 44 fixed to a longitudinal shaft 45. From the shaft 45 power is transmitted through the medium of chains 46, 47 and 48 to screw conveyers 16, one of the elevators 12, and one of the rotary measurers 14 (see Fig. 5), and said shaft is also provided with a bevel gear 49 which meshes with a similar gear 50 fixed to cross shaft 51, journaled in the standards 51'.

From the shaft 51 the agitators 21 are driven through gearing 52, and a bevel gear 53 meshing with a similar gear 54 imparts movement to shaft 55 which lies parallel to shaft 45. Power is also transmitted from this shaft 51 through the intermedium of gearing 56 to shaft 34, whereby conveyer 24 is operated. Shaft 55, like shaft 45, drives a pair of chains 57 and 58 for operating the other measurer 14 and elevator 12.

Conveyers 5 are driven from shafts 55 and 45 respectively, a pair of shafts being arranged at each side of the vehicles, and each pair of shafts being driven from its respective shaft by gearing, as 60. The upper or vertical shaft of each pair transmits power to the lower shaft 60' by gearing 61 and said lower shafts are provided with gearing which mesh with gear 60' fixed to the adjacent end of the rollers 6 over which conveyer belts 5 pass.

The bunkers 13 and 15 are of such dimensions as to hold a large supply of material; therefore when the hoppers 3 are exhausted of their supply vehicles 2 can be removed and other vehicles filled with the desired materials substituted, and the transfer of fresh materials made without requiring any cessation in the operation of the mixer mechanism or of the progressive movement of the whole apparatus along the work, the bunkers holding enough materials to supply the mixer while the substitution is being made. It will further be observed that elevators 12 and conveyers 5 can be employed to convey and elevate any two materials simultaneously as heretofore intimated, and by having the speed of the conveying and elevating mechanism exceed that of the mixing mechanism different materials can be alternately fed to conveyers 5, so that, although there are only two conveyers, and may be only one, three or more different materials can be regularly supplied to the bunkers on vehicle 1.

In Figs. 1 and 4 inclusive I have shown an arrangement of cars with plain wheels, but my improvement is equally capable of use in connection with other arrangements and with cars having flanged wheels and adapted for either a street car or railroad tracks (see Figs. 5 and 6).

In operation, assuming that the engine is running as indicated by the arrow (see Fig. 5), the several parts will be operated as indicated by the several arrows, shaft 45 receiving power from shaft 43 and operating conveyers 16 through chain 46, one of the elevators 12 through chain 47, and one of the rotary measurers 14 through the medium of chain 48. Cross shaft 51 receives power from said shaft 45, as heretofore explained, and operates shafts 22 which as indicated by arrows, rotate in opposite directions so as to cause a more thorough intermingling of the several materials; it also operates conveyer 24, chain belt 64 which drives the rotary measurer 17, and shaft 55. Shaft 55 operates the other elevator 12 and rotary measurer 14. The gravel bunker 15 has sliding doors 68 in its bottom at a point above conveyer 16 (see Figs. 5 and 10) which can be opened more or less to regulate the discharge or to relieve vertical pressure on the worm. In order to direct the materials elevated by elevators 12 to the proper bunkers, said materials are first deposited into a receiving hopper 62 which is divided by a partition 63 and swinging gate 64 into two compartments 62' and 62''. From each compartment opposite discharge tubes 65 lead to one bunker 13 and to bunker 15, and branch tubes 66 extend from certain of tubes 65 to the opposite bunkers 13. All of these tubes are provided with suitable sliding gates as 65', and therefore the material contained in hopper 62 can be discharged into either of bunkers 13 or bunker 15 by proper manipulation of said gates. It will further be observed that by swinging gate 64 to either of the positions indicated by dotted lines in Fig. 13 material deposited into either of compartments 62' and 62'' can be transferred to the other compartment.

In view of the foregoing it will be perceived that by my invention a compact apparatus is provided which will take the various raw materials from the original vehicles in which they are brought to the scene of the work, mix them in any desired proportions and deposit the mixture at any desired point or practically spread out, as in the case of being applied to street paving, the whole apparatus operating and moving continuously and progressively as the work advances over any desired area, and being transportable from one scene of work to another, the result being the almost complete elimination of hand labor in the supplying of materials to the machine as well as in mixing and depositing in place, as walls or pavements, of such mixtures as concrete.

In the drawings I have shown an illustrative form of construction. It will be apparent, however, that the particular form of the parts of the apparatus shown can be readily altered and changes in the minor details of construction can be made without departing from the spirit of my invention as defined in the appended claims.

Having thus described my invention, what I claim as new, and desire to secure by Letters Patent of the United States of America, is:—

1. The combination of a vehicle containing mechanism for operating on materials, and a plurality of bunkers to hold a reserve supply of said materials connected to said mechanism by a feeding apparatus, and a conveying means for supplying said bunkers with said materials consisting of an elevator having means for variously directing its discharge into any of said bunkers and of a horizontal conveyer adapted and arranged to travel longitudinally with and propelled by said vehicle and projecting longitudinally outward from the side and beyond the end of said vehicle to and beyond the sources of supply of said materials arranged adjacent to the line of travel of said conveyer, the inner end of said conveyer being attached to said vehicle and the outer portion having independent wheeled support and being free and clear from all other parts of the apparatus and occupying a plane close to the ground with its receiving parts lower than the sources of supply of said materials, the supplying capacity of said conveying means being largely in excess of the feeding capacity of the apparatus connecting the bunkers and mechanism for operating on materials, and a means for simultaneously moving and operating said vehicle and said conveying means.

2. The combination of a vehicle containing mechanism for operating on materials, and a plurality of bunkers to hold a reserve supply of said materials connected to said mechanism by a feeding apparatus, and a conveying means for supplying said bunkers with said materials consisting of two elevators correspondingly arranged on opposite sides of said vehicle, each elevator having a means of variously directing its discharge into any of said bunkers and two horizontal conveyers each connected with an elevator and extending parallel with one another and adapted and arranged to travel longitudinally with and propelled by said vehicle and projecting longitudinally outward from the side and beyond the end of said vehicle to and beyond the sources of supply of said materials, said sources of supply being arranged adjacent and superior to said conveyers, the inner ends of said conveyers being attached to said vehicle and the outer portions having independent wheeled support and being free and clear from all other parts of the apparatus and occupying a plane close to the ground with their receiving parts lower than the sources of supply of said materials, the supplying capacity of said conveying means greatly exceeding the feeding capacity of said apparatus connecting the bunkers to the mechanism for operating on said materials, and a means for simultaneously moving and operating said vehicle and its mechanism and said conveying means.

3. The combination of a vehicle containing mechanism for operating on a plurality of materials, and a plurality of bunkers to hold reserve supplies of said materials connected to said mechanism by feeding apparatus, and a means for supplying said bunkers with said materials, while said vehicle is traveling, from a succession of supply vehicles successively arranged in a position along the line of progress of said first vehicle, consisting of a conveying means adjustably adapted to discharge into any of the bunkers with a horizontal receiving conveyer adapted and arranged to travel longitudinally with and propelled by said first vehicle and projecting outward therefrom along the side and beyond the end thereof to and beyond said supply vehicles, said supply vehicles being arranged adjacent and superior to said conveyer, the inner end of said conveyer being attached to said first vehicle and the outer portion having independent wheeled support and being free and clear from all other parts of the apparatus, and occupying a plane close to the ground with its receiving parts lower than the discharge outlets of said supply vehicles.

4. The combination of a vehicle containing mechanism for operating on a plurality of materials, and a plurality of bunkers to hold reserve supplies of said materials connected to said mechanism by feeding apparatus, and a means for supplying said bunkers with said materials, while said vehicle is traveling, from a succession of supply vehicles successively arranged in a position along the line of progress of said first vehicle, consisting of a conveying means adjustably adapted to discharge into any of the bunkers with a horizontal receiving conveyer adapted and arranged to travel longitudinally with and propelled by said first vehicle and projecting outward therefrom along the side and beyond the end thereof to and beyond said supply vehicles, said supply vehicles being arranged adjacent and superior to said conveyer, the inner end of said conveyer being attached to said first vehicle and the outer portion having independent wheeled support and being free and clear from all other parts of the apparatus, and occupying a plane close to the ground with its receiving parts lower than the discharge outlets of said supply vehicles, and said succession of supply vehicles, gravity discharging and having means for restraining and regulating said discharge and successively arranged in position along the line of progress of said first vehicle, with their discharge outlets superior to said horizontal receiving conveyer.

5. The combination of a vehicle containing a mechanism for operating on a plurality of materials and a plurality of bunkers to hold reserve supplies of said materials connected to said mechanism by feeding apparatus, and a means for supplying said bunkers with said materials, while said vehicle is traveling, from a plurality of supply vehicles arranged along the line of travel of said first vehicle, consisting of two duplicate sets of conveying means correspondingly arranged on opposite sides of said first vehicle, each set having means for variously directing its discharge into any of the bunkers, and each having a horizontal receiving conveyer adapted and arranged to travel longitudinally with and propelled by said first vehicle and projecting outward therefrom along the side and beyond the end thereof to and beyond said supply vehicles, said supply vehicles being arranged adjacent and superior to said conveyer, the inner end of said conveyer being attached to said first vehicle and the outer portion having independent wheeled support and being free and clear from all other parts of the apparatus and occupying a plane close to the ground with its receiving parts lower than the discharge outlets of said supply vehicles.

6. The combination of a vehicle containing a mechanism for operating on a plurality of materials and a plurality of bunkers to hold reserve supplies of said materials connected to said mechanism by feeding apparatus, and a means for supplying said bunkers with said materials, while said vehicle is traveling, from a plurality of supply vehicles arranged along the line of travel of said first vehicle, consisting of two duplicate sets of conveying means correspondingly arranged on opposite sides of said first vehicle, each set having means for variously directing its discharge into any of the bunkers, and each having a horizontal receiving conveyer adapted and arranged to travel longitudinally with and propelled by said first vehicle, and projecting outward therefrom along the side and beyond the end thereof to and beyond said supply vehicles, said supply vehicles being arranged adjacent and superior to said conveyer, the inner end of said conveyer being attached to said first vehicle and the outer portion having independent wheeled support and being free and clear from all other parts of the apparatus and occupying a plane close to the ground with its receiving parts lower than the discharge outlets of said supply vehicles, and said supply vehicles gravity discharging and having means for directing and regulating their discharge and arranged in position along the line of travel of said first vehicle with their discharge outlets superior to both of said horizontal receiving conveyers.

7. The combination of a vehicle containing a mechanism for operating on and disposing of a plurality of materials and a means for keeping said mechanism continuously supplied with all of said materials, while said vehicle is traveling, from a succession of intermittently arriving detached supply vehicles, said means consisting of bunkers connected to said mechanism by a feeding apparatus and of a conveying means extending from said bunkers and outward from said first vehicle to said supply vehicle, but not attached to said supply vehicle, and being arranged and adapted to receive said materials by gravity from said supply vehicles and to maintain while traveling a substantially constant receiving relation to said supply vehicle, and said conveying means being adapted and arranged to permit said supply vehicle to depart from said discharging position, while said first vehicle and said conveying means are traveling, and be succeeded by another supply vehicle in said discharging position.

8. The combination of a vehicle containing a mechanism for operating on and disposing of a plurality of materials, and a plurality of bunkers to hold reserve supplies of said materials connected to said mechanism by feeding apparatus, and a conveying means for transferring said materials from a succession of intermittently arriving supply vehicles to any of said bunkers while said first vehicle is traveling, said conveying means being adapted to discharge into any of said bunkers, and being connectible and disconnectible, while traveling, successively to each of a series of supply vehicles.

9. The combination of a vehicle containing a mechanism for operating on a plurality of materials, and a plurality of bunkers to hold reserve supplies of said materials connected to said mechanism by feeding apparatus, and a means for transferring material from a detached supply vehicle to any of said bunkers while said first vehicle is traveling, said means consisting of an elevator having means for variously directing its discharge into any of said bunkers, and of a horizontal receiving conveyer projecting from said first vehicle and along the side and beyond the end thereof to and beyond said supply vehicle arranged along the line of travel of said first vehicle, said conveyer having independent wheeled support, but being attached to and propelled longitudinally by said first vehicle, and occupying a plane close to the ground with its receiving parts lower than the discharge outlets of said supply vehicle, and of said supply vehicle containing material arranged with its discharge outlets superior to said receiving conveyer and having means for restrainedly discharging said material by gravity upon said receiving conveyer and for regulating said discharge so as to feed said material to said conveyer.

10. The combination of a vehicle containing a mechanism for continuously operating on and disposing of a plurality of materials, and bunkers to hold reserve supplies of said materials connected to said mechanism by feeding apparatus, and a means for keeping all of said bunkers replenished from intermittently arriving supply vehicles while said first vehicle is traveling, said replenishing means consisting of an elevator, a horizontal receiving conveyer and said supply vehicles containing loads of said materials, the elevator having means for directing its discharge into any of said bunkers, the horizontal receiving conveyer projecting from said first vehicle and along the side and beyond the end thereof to and beyond said supply vehicles, said conveyer having independent wheeled support, and being attached to and propelled longitudinally by said first vehicle and occupying a plane close to the ground with its receiving parts lower than the discharge outlets of said supply vehicles, and said supply vehicles being successively arranged along the line of travel of said receiving conveyer with their discharge outlets superior thereto and having means for restrainedly discharging said material by gravity upon said receiving conveyer and for regulating said discharge so as to feed said material to said conveyer.

11. The combination of a vehicle containing a concrete mixing and distributing mechanism and a plurality of bunkers to hold reserve supplies of the ingredients of said mixture connected to said mechanism by feeding apparatus, and an elevator having means for directing its discharge into any of said bunkers, and of a horizontal receiving conveyer lying close to the ground having independent wheeled support but attached to and propelled longitudinally by the said vehicle and projecting beyond the end of said vehicle along its side and being free and clear from all other parts of the apparatus so as to be approachable by vehicles on all sides and free from obstructions and open at the top to receive material falling upon it at any point along its length, whereby it is enabled to receive material while traveling from an adjacent and superior source of supply, and of a vehicle containing material for said bunkers and having a gated discharge outlet at or near the bottom of its load whereby it can gradually feed said load to a receiving conveyer and arranged adjacent to said conveyer with its discharge outlet above the same.

12. The combination of a vehicle with a mechanism for operating on and disposing of a plurality of materials, a storage means for accumulating a surplus of said materials connected to said mechanism by a feeding apparatus, and a conveying means attached to said vehicle, and extending outward therefrom to a second vehicle containing said material, for transferring said material from said second vehicle to said storage means while said first vehicle is traveling.

13. The combination of a vehicle with a means for containing or holding a plurality of materials, said means being equipped with means for discharging said materials, and a conveying means, attached to said vehicle and extending outward therefrom to a second vehicle containing one of said materials, for transferring said material from said second vehicle to said containing or holding means on said first vehicle.

14. The combination of a vehicle with a mechanism for operating on a plurality of materials, a storage means for holding a quantity of said materials connected to said mechanism by a feeding apparatus, and a conveying means, attached to said vehicle and extending outward therefrom to a second vehicle containing one of said materials, for transferring said material to said storage means.

15. The combination of a vehicle with a mechanism for operating on material, a storage means for holding said material connected to said mechanism, a second vehicle separately mounted containing said material and discharging its load by gravity, and a conveying means extending from said first vehicle to said second vehicle for receiving said material from said second vehicle by gravity and transferring said material to said storage means.

16. In an apparatus for making and placing concrete, the combination of a vehicle provided with a mixer, bunkers on the vehicle adjacent to the mixer for holding a supply of material to be mixed, a second vehicle and conveying means associated with said vehicle for transferring materials to said bunkers from said second vehicle while traveling.

17. In an apparatus for making and placing concrete, the combination of a vehicle provided with a mixer, bunkers on the vehicle adjacent to the mixer for holding a supply of materials to be mixed, a second vehicle and a conveying means associated with said vehicles for transferring materials to said bunkers from said second vehicle while traveling, said second vehicle being attachable to and detachable from said means.

18. In an apparatus for making concrete, or asphaltic or other mixtures of materials, the combination of a vehicle provided with apparatus for treating materials, and a means on said vehicle for holding a supply of said materials to be treated and a conveying means, associated with said vehicle, for transferring materials to said holding means while said vehicle is traveling, said conveying means extending outward from said vehicle to a detached container of materials to be transfererd to said holding means, said conveying means being connectible to and disconnectible from said container while said vehicle is traveling.

19. In an apparatus for making concrete, or asphaltic or other mixtures of materials, the combination of a vehicle provided with apparatus for treating materials, and a means on said vehicle for holding a supply of said materials to be treated and a conveying means, associated with said vehicle, for transferring materials to said holding means while said vehicle is traveling, said conveying means extending outward from said vehicle to a detached container of materials to be transferred to said holding means, said conveying means being connectible to and disconnectible from said container while said vehicle is traveling, and of said detached container, connectible to and disconnectible from said conveying means while said vehicle is traveling.

20. In an apparatus for making concrete, or asphaltic or other mixtures of materials, the combination of a vehicle provided with a means for holding a supply of materials to be treated, and a conveying means, associated with said vehicle, for transferring materials to said holding means while said vehicle is traveling, said conveying means extending outward from said vehicle to a detached container of materials to be transferred to said holding means, said conveying means being connectible to and disconnectible from said container while said vehicle is traveling, and of said detached container, connectible to and disconnectible from said conveying means while said vehicle is traveling.

In testimony whereof I affix my signature in presence of two witnesses.

JOHN F. GARRETTY.

Witnesses:
  GEO. R. TENNANT,
  NORWOOD W. BROCKETT.